Aug. 23, 1960    W. P. VAN DEN BLINK    2,950,380
SLAG-FORMING BODIES FOR ELECTRIC ARC WELDING
Filed Dec. 10, 1958
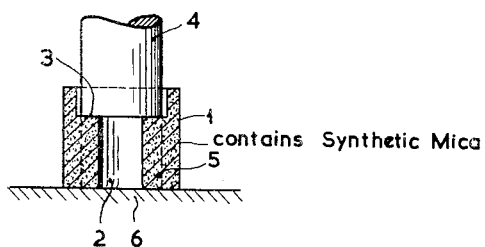
INVENTOR
WILLEM P. VAN DEN BLINK
BY
AGENT United States Patent Office 2,950,380
Patented Aug. 23, 1960

2,950,380

SLAG-FORMING BODIES FOR ELECTRIC ARC WELDING

Willem Pieter van den Blink, Utrecht, Netherlands, assignor to North American Philips Company, Inc., New York, N.Y., a corporation of Delaware Filed Dec. 10, 1958, Ser. No. 779,400

Claims priority, application Netherlands Dec. 23, 1957

6 Claims. (Cl. 219—99)

My invention relates to slag-forming bodies for use in electric arc welding, and more particularly to cartridges used in stud-welding and coatings of welding electrodes.

As my invention is particularly suited for use in connection with the slag-forming stud-welding cartridges or ferrules such as those described in U.S. Patent Nos. 2,509,999, 2,829,234, and 2,833,914, I shall describe the same in more detail in connection therewith. However, the invention is not limited thereto, but extends to other types of slag-forming bodies for welding, such as the coatings of welding electrodes.

Considerable difficulty has been encountered with slag-forming bodies, particularly stud-welding cartridges, because of mechanical damage and attempts have been made to increase the mechanical strength by the addition of certain materials. Following the proposal to increase the rigidity of layers of paint by adding scales of natural mica to the paint, it has been suggested to add this material, as well as asbestos, to welding rod coating materials.

I have found that the use of natural mica or asbestos for this purpose causes difficulties and that this is due to the fact that these materials in their natural state split off their chemically-bound water at the elevated temperatures which occur during welding. In some cases, for instance in the case of the natural mica known as muscovite, the water begins to split off at a temperature of about 800° C., in the case of the natural mica known as phlogopit at about 1000° C., and with asbestos at a temperature generally as low as 500° C. This liberated water exerts an extremely detrimental effect upon the quality of the weld, and must be avoided, particularly when certain types of coating materials, such as a basic coating material, are used. Similar difficulties arise in the case of slag-forming bodies used in stud-welding and are more serious in this case because the arc is initially confined within the cartridge.

In accordance with the invention, I have found that the above difficulties can be avoided and at the same time slag-forming bodies of high mechanical strength can be obtained by incorporating particles of synthetic mica in the bodies, because this material does not split off water during the welding process and its plate-like crystal structure imparts a high mechanical strength to the bodies.

In order that the invention may clearly be understood and readily carried to this effect, I shall describe the same in more detail with reference to the accompanying drawing in which the single figure is a sectional view of a stud-welding cartridge positioned on a work piece and showing a stud in position for welding.

The slag-forming body or cartridge 1 shown in the drawing is of tubular shape and is provided with a shoulder 3 supporting a stud 4, and a central cavity 2 in which the welding arc can be initiated. When the welding arc is struck between the stud 4 and a work piece 6 a portion of the cartridge within the dotted lines fuses, whereupon the stud moves downwardly into contact with the work piece.

The slag-forming body 1 may be formed of any of the various slag-forming materials known in the art, such as those described in the above-mentioned patents, through which, in accordance with the invention, are distributed particles of synthetic mica.

The term "synthetic mica" is to be understood to include the various types of mica substitutes which are similar in chemical composition to natural mica, but which do not split off water at the elevated temperatures used in electric arc welding. Such synthetic micas are usually characterized by the fact that the OH— group which occurs in natural mica are replaced by F-ions. Particularly good results have been obtained when using the synthetic mica known as Fluorphlogopite having the chemical composition $KMg_3A_1Si_3O_{10}F_2$. This mica is made by calcinating a mixture of quartz, bauxite and magnesite to drive off carbon dioxide, adding potassium fluorosilicate and melting at 1400° C. As the furnace cools, the mica crystals grow from a seed at the bottom of the crucible.

The amount of synthetic mica used depends upon the shape of the slag-forming body and upon the type of slag-forming material used, but in general constitutes about 0.5% to 5% by weight of the body. The size of the synthetic mica particles is important in order to obtain the best mechanical strength and at the same time not deleteriously effect the manufacture of the body. If these particles are made too small a satisfactory mechanical strength will not be obtained, whereas if they are made too large they will interfere with the manufacture of the slag-forming bodies, particularly if the bodies are formed by extrusion. I have found that in practice a particle size of between about 0.3 and 5 mms. gives satisfactory results both from the standpoint of manufacture and mechanical strength.

*Example I*

The slag-forming cartridge 1 may be formed in the manner described below from the following composition:

| | Kgs. |
|---|---|
| Titanium dioxide | 42 |
| Zirconium silicate | 16 |
| Natron fieldspar | 23 |
| Bentonite | 8.5 |
| Silicomanganese | 8 |
| Fluorphlogopite | 2.5 |
| Total | 100 |

The above materials are intermittently mixed and the mixture is molded into the form of the slag-forming body by means of suitable dies. The molded body is then heated to a high temperature, for instance, about 1100° C., in a neutral or reducing atmosphere to thereby sinter the material into a rigid body.

*Example II*

A slag-forming body in the form of a coating for a welding rod may be formed in the manner described below from the following materials:

| | Kgs. |
|---|---|
| Fluorspar | 27 |
| Chalkspar | 30 |
| Ferromanganese | 4 |
| Ferrosilicon | 5 |
| Ferrotitanium | 7 |
| Natron fieldspar | 6 |
| Powdery iron | 10 |
| Fluorphlogopite | 1.5 |
| Bentonite | 5 |
| Potassium waterglass (dissolved in water) | 4.5 |
| Total | 100 |

All of the above substances, with the exception of the potassium waterglass, are mixed together in a dry state and then the potassium waterglass in an aqueous solution is added. The resulting mixture is then kneaded into a pasty mass which is extruded on a suitable core to form the slag-forming coating.

While I have described my invention in connection with specific examples and certain specific materials, I do not desire to be limited thereto as obvious modifications will readily present themselves to one skilled in this art.

What is claimed is:

1. A slag-forming body such as a stud-welding cartridge or electrode coating, comprising slag-forming material and means to increase the mechanical strength of the body including particles of synthetic mica distributed throughout said material.

2. A slag-forming body such as a stud-welding cartridge or electrode coating comprising slag-forming material and means to increase the mechanical strength of the body including about 0.5% to 5% by weight of particles of synthetic mica distributed throughout said material, said particles having a size of about 0.3 to 5 mms.

3. A slag-forming body such as a stud-welding cartridge or electrode coating comprising slag-forming material and means to increase the mechanical strength of the body including particles of fluorphlogopite distributed throughout said material.

4. A stud-welding cartridge comprising a pressed mixture of slag-forming material and means to increase the mechanical strength of the cartridge including particles of synthetic mica distributed throughout said material, said particles being distributed throughout the body and having a size of about 0.3 to 5 mms.

5. An arc welding electrode comprising a core, and a coating on said core and comprising slag-forming material and means to increase the mechanical strength of the coating including particles of synthetic mica distributed throughout said material, said particles forming about 0.5% to 5% by weight of the coating and having a size of about 0.3 to 5 mms.

6. A stud-welding cartridge comprising a sintered mixture of slag-forming material and means to increase the mechanical strength of the cartridge including particles of synthetic mica distributed throughout said material, said mixture being substantially free from binders.

References Cited in the file of this patent

UNITED STATES PATENTS

| | | |
|---|---|---|
| 2,452,493 | Rollason et al. | Oct. 26, 1948 |
| 2,720,473 | Donahey | Oct. 11, 1955 |